United States Patent [19]

Saeki et al.

[11] Patent Number: 5,101,952
[45] Date of Patent: Apr. 7, 1992

[54] CLUTCH DISK

[75] Inventors: Tomohiro Saeki, Toyoake; Yoshio Iida, Komaki, both of Japan

[73] Assignees: Aisin Seiki Kabushiki Kaisha, Kariya; Tokai Rubber Industries, Ltd., Komaki, both of Japan

[21] Appl. No.: 663,306

[22] Filed: Mar. 1, 1991

[30] Foreign Application Priority Data

Mar. 7, 1990 [JP] Japan .................. 2-23049[U]

[51] Int. Cl.⁵ .............................................. F16D 3/14
[52] U.S. Cl. ............................ 192/106.1; 192/106.2
[58] Field of Search ..................... 192/106.1, 106.2

[56] References Cited

U.S. PATENT DOCUMENTS

| | | | |
|---|---|---|---|
| 2,964,930 | 12/1960 | Aira et al. | 192/106.1 |
| 3,386,265 | 6/1968 | Kasaback | 192/106.1 X |
| 3,809,198 | 5/1974 | Mori | 192/106.1 X |
| 3,811,545 | 5/1974 | Sato et al. | 192/106.1 |
| 4,474,276 | 10/1984 | Loizeau | 192/106.1 |
| 4,537,298 | 8/1985 | Loizeau | 192/106.1 X |
| 4,547,176 | 10/1985 | Loizeau | 192/106.1 X |
| 4,549,642 | 10/1985 | Loizeau | 192/106.1 X |
| 4,560,366 | 12/1985 | Loizeau | 192/106.1 X |
| 4,709,796 | 12/1987 | Uenobara | 192/106.1 |
| 4,856,638 | 8/1989 | Roth et al. | 192/106.1 |
| 4,938,729 | 7/1990 | Hanada et al. | 192/106.1 X |

Primary Examiner—Leslie A. Braun
Assistant Examiner—Andrea Pitts
Attorney, Agent, or Firm—Oblon, Spivak, McClelland, Maier & Neustadt

[57] ABSTRACT

Disclosed is a clutch disk comprising a clutch hub including a flange formed on an outer periphery thereof, the flange having a plurality of openings, a first side plate including a plurality of openings, a second side plate including a plurality of openings, a plurality of dampers disposed in the openings of the flange of the clutch hub, the first side plate and the second side plate, and including an elastic member tapering from wide to narrow in an axial direction thereof away from one end thereof to a central portion thereof and tapering from narrow to wide in an axial direction thereof away from the central portion thereof to another end thereof, and sheet members disposed on both ends of the elastic member, and a facing connected to one of the first side plate and the second side plate. Since the elastic members deform less in radial directions when the clutch disk operates, it is necessary to enlarge the sheet members in radial directions only by a miniumum required dimension in order to inhibit the elastic members from interfering with the flange of the clutch hub, and the first and second side plates. Thus, the clutch disk can be down-sized in an axial direction. Further, stresses caused by a rotational moment, can be reduced and inhibited from concentrating on the both ends of the elastic members. Thus, the durability of the dampers can be improved.

4 Claims, 3 Drawing Sheets

CLUTCH DISK

BACKGROUND OF THE INVENTION

1. Field of the Invention

The present invention relates to a clutch disk of a friction clutch engaging and disengaging a power transmission of a vehicle, a ship, or the like, and more particularly to a clutch disk having a plurality of dampers.

2. Description of the Prior Art

So far, dampers 600 employed in a conventional clutch disk have been including a rubber-like elastic member 601 illustrated in FIG. 5. As illustrated in FIG. 5, the dampers 600 include the rubber-like elastic member 601 having a cylindrical shape and sheet members 602 engaging with or being adhered to the both ends of the rubber-like elastic member 601.

When the conventional clutch disk operates and a rotational moment is exerted on the dampers of the conventional clutch disk, the rubber-like elastic members 601 of the dampers 600 deform or swell heavily at a central portion thereof as illustrated in FIG. 6. As a result, there is a fear that the deformed or swollen rubber-like elastic members 601 might interfere with a flange of a clutch hub (not shown in FIG. 6) or first and second side plates (not shown in FIG. 6) disposed over the both surfaces of the flange of the clutch hub. The sheet members 602 of the dampers 600 should accordingly be enlarged in radial directions in order to inhibit the deformed or swollen rubber-like elastic members 601 from interfering with the flange of the clutch hub or the first and second side plates. Consequently, there arises a problem resulting in a clutch disk enlarging in an axial direction.

In addition, when the clutch disk of the prior art operates, the rubber-like elastic members 601 of the dampers 600 have swollen as described above, and accordingly tensile stresses concentrate on the outer peripheral portion of the rubber-like elastic members 601 of the dampers 600. Namely, since the outer peripheral portion of the rubber-like elastic members 601 deforms more than the inner peripheral portion thereof does, the tensile stresses have concentrated on the outer peripheral portion thereof. Hence, cracks are liable to occur on the outer peripheral portion of the rubber-like elastic members 601 of the dampers 600. In particular, since the both ends of the outer peripheral portion of the rubber-like elastic members 601 are engaged with or adhered to the sheet members 602, the rubber-like elastic members 601 are liable to come off the sheet members 602 at the both ends of the outer peripheral portion thereof when the tensile stresses are concentrated on the both ends of of the outer peripheral portion of the rubber-like elastic members 601.

SUMMARY OF THE INVENTION

The present invention has been developed in view of the above-described problems of the conventional clutch disk. It is therefore an object of the present invention to solve the problems by modifying a configuration of an elastic member of dampers of a clutch disk, thereby inhibiting the elastic member from deforming or swelling heavily and consequently inhibiting the clutch disk from enlarging in an axial direction.

The above and other object of the present invention can be achieved by a clutch disk according to the present invention. The clutch disk comprises:

a clutch hub including a flange formed on an outer periphery thereof, the flange having a plurality of openings and a plurality of cut-offs working as stoppers, and the clutch hub engaging with a rotary shaft;

a first side plate including a plurality of openings disposed at positions corresponding to the openings of the flange of the clutch hub, and the first side plate disposed over one surface of the flange of the clutch hub;

a second side plate including a plurality of openings disposed at positions corresponding to the openings of the flange of the clutch hub, the second side plate disposed over another surface of the flange of the clutch hub and connected to the first side plate by way of a plurality of stopper pins;

a plurality of dampers for elastically connecting the clutch hub, the first side plate and the second side plate, the dampers disposed in the openings of the flange of the clutch hub, the openings of the first side plate and the openings of the second side plate, and including an elastic member tapering from wide to narrow in an axial direction thereof away from one end thereof to a central portion thereof and tapering from narrow to wide in an axial direction thereof away from the central portion thereof to another end thereof, and sheet members disposed on both ends of the elastic member; and a facing connected to an outer peripheral portion of one of the first side plate and the second side plate.

One of the major features of the present invention lies in the dampers. The dampers include the elastic member which tapers from wide to narrow in an axial direction thereof away from one end thereof to a central portion thereof and which tapers from narrow to wide in an axial direction thereof away from the central portion thereof to another end thereof, and the sheet members which is disposed on both ends of the elastic member.

Since the elastic members of the dampers are tapered in an axial direction as described above, the elastic members are made to less likely to deform or swell in radial directions, especially the deforming or swelling is made to occur less remarkably at the central portion thereof than that of the conventional rubber-like elastic members 601. Hence, by employing the dampers having the above-described arrangement, the elastic members of the dampers are made not to deform or swell heavily so that they interfere with the flange of the clutch hub, the first side plate and the second side plate when the clutch disk according to the present invention operates. Accordingly, it is unnecessary to enlarge the sheet members of the dampers in radial directions more than required in order to avoid the interference. Thus, the clutch disk according to the present can be down-sized in an axial direction more than the conventional clutch disk.

In addition, since the elastic members of the dampers deform or swell less in radial direction than the conventional rubber-like elastic members 601 do, especially since the elastic members deform or swell less at the central portion thereof than the conventional ones do, it is possible to disperse the tensile stresses, caused by the rotational moment resulting from the operating clutch disk, to the central portion of the elastic members. As a result, it is possible to reduce the concentration of the tensile stresses on the outer peripheral portion at the both ends of the elastic members and to inhibit the elastic member from breaking or coming off the sheet members at the both ends thereof.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENT

Having generally described the present invention, a further understanding can be obtained by reference to the specific preferred embodiment which is provided herein for purposes of illustration only and is not intended to limit the scope of the appended claims.

Figure 1:
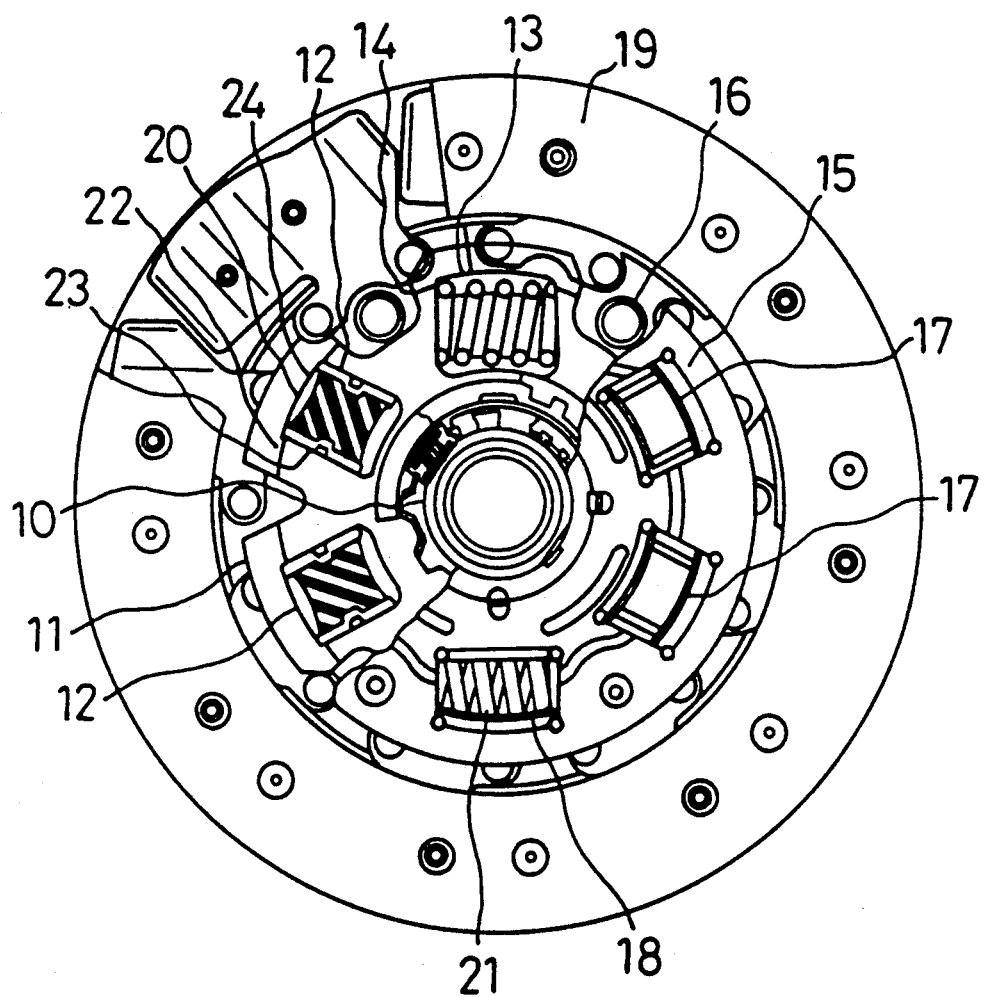
FIG. 1 is a partly cut-away front view of a clutch disk of a preferred embodiment according to the present invention.
Figure 2:
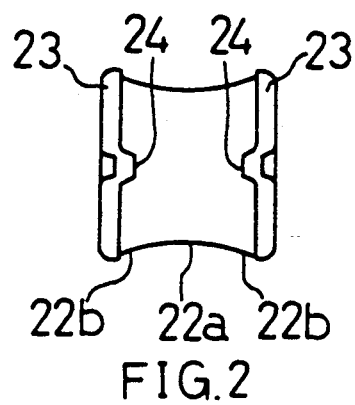
FIG. 2 is an enlarged front view of a damper of the clutch disk of the preferred embodiment according to the present invention.
Figure 3:
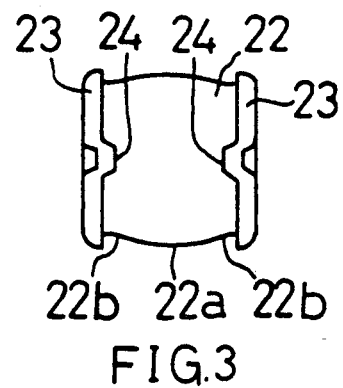
FIG. 3 is an enlarged front view of the operating damper shown in FIG. 2.

The clutch disk of the preferred embodiment according to the present invention will be hereinafter described with reference to FIGS. 1, 2 and 3. In particular, FIG. 1 is a partly cut-away front view of the clutch disk, FIG. 2 is an enlarged front view of an operating damper of the clutch disk, and FIG. 3 is an enlarged front view of the operating damper shown in FIG. 2.

The clutch disk comprises a clutch hub 10, first and second side plates 15, a plurality of first dampers 20, a plurality of second dampers 21, and a facing 19.

The clutch hub 10 includes a flange 11 formed on an outer periphery thereof. The flange 11 has a plurality of first openings 12, a plurality of second openings 13 and a plurality of cut-offs 14 working as stoppers. As illustrated in FIG. 1, the first openings 12 herein mean the four (4) openings disposed on the right and left-hand sides of the flange 11 of the clutch hub 10. The upper right-hand side first opening 12 and the lower left-hand side first opening 12 are disposed symmetrically in a radial direction thereof, so are the other two (2) first openings 12. The second openings 13 herein mean the two (2) openings 13 disposed vertically on the central portion of the flange 11 of the clutch hub 10, and they are disposed symmetrically in a radial direction. Further, the clutch hub 10 engages with a rotary shaft (not shown) with a spline.

The first and second side plates 15 include a plurality of first openings 17 disposed at positions corresponding to the first openings 12 of the flange 11 of the clutch hub 10 and a plurality of second openings 18 disposed at positions corresponding to the second openings 13 of the flange 11 of the clutch hub 10. The positional relationships of the first and second openings 12 and 13 in the flange 11 of the clutch hub 10 similarly apply to those of the first and second openings 17 and 18 in the first and second side plates 15. Further, a plurality of stopper pins 16 connect the first and second side plates 15. Furthermore, a facing 19 is provided on the second side plate 15 at an outer peripheral portion thereof. A torque is applied from a power transmission (not shown) to the clutch disk of the preferred embodiment by way of the facing 19.

In the first openings 12 of the flange 11 of the clutch hub 10 and in the first openings 17 of the first and second side plates 15, a plurality of first dampers 20 are disposed. The first dampers 20 elastically connect the flange 11 of the clutch hub 10 and the first and second side plates 15, and include an elastic member 22 and sheet members 23 disposed on both ends of the elastic member 22.

In the second openings 12 of the flange 11 of the clutch hub 10 and in the second openings 18 of the first and second side plates 15, a plurality of second dampers 21 are disposed. Likewise, the second dampers 21 elastically connect the flange 11 of the clutch hub 10 and the first and second side plates 15. As can be seen from FIG. 1, the second dampers 21 are torsion springs.

The arrangements of the clutch disk of the preferred embodiment according to the present invention described so far are identical with those of the conventional clutch disk. The features of the clutch disk will be hereinafter described.

Figure 4:
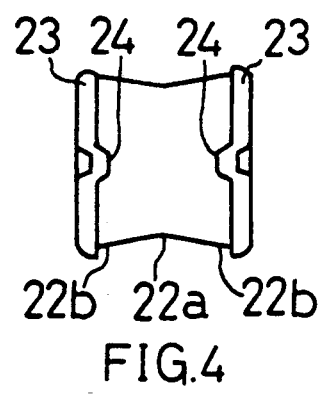
FIG. 4 is an enlarged front view of a modified version of the damper of the clutch disk of the preferred embodiment according to the present invention.
Figure 5:
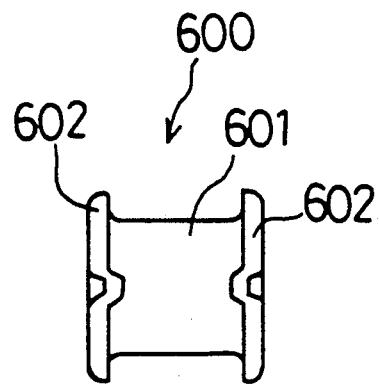
FIG. 5 is an enlarged front view of a damper of a conventional clutch disk.

The first dampers 20 are one of the major features of the clutch disk of the preferred embodiment according to the present invention. The elastic members 22 of the first dampers 20 are formed in a special shape and the sheet members 23 thereof are disposed on the both ends of the elastic members 22. Namely, as illustrated in FIGS. 2 and 4, the special shape of the elastic member 22 herein means that the elastic member 22 is tapered from wide to narrow in an axial direction thereof away from one end thereof to a central portion thereof and that it is further tapered from narrow to wide in an axial direction thereof away from the central portion thereof to another end thereof. In particular, as illustrated in FIG. 2, the elastic member 22 has a cylindrical shape having a cross section defined by arc-like lines in the clutch disk of the preferred embodiment. The sheet members 23 of the first dampers 20 include a flat disk portion and a convexed portion 24 disposed at a central portion thereof. In the clutch disk of the preferred embodiment, the elastic member 22 is made of a rubber, the sheet members 23 are made of a metal, and the convexed portion 24 of the sheet members 23 engages with a concaved portion of the elastic member 22 disposed at both ends.

However, the present invention is not limited to the arrangements described above. Accordingly, the elastic member 22 may be formed to have have a shape in which two (2) truncated cones are connected at the top surfaces as illustrated in FIG. 4. Further, the elastic member 22 may have a hole penetrating through itself in an axial direction and engaging with the convexed portion 24 of the sheet members 23. Furthermore, the elastic member 22 may be made of not only a rubber but also a flexible plastic such as a flexible vinyl chloride resin, a flexible polyurethane foam, or the like. Moreover, the convexed portion 24 of the sheet members 23 may be adhered to the concaved portion of the elastic member 22.

Figure 6:
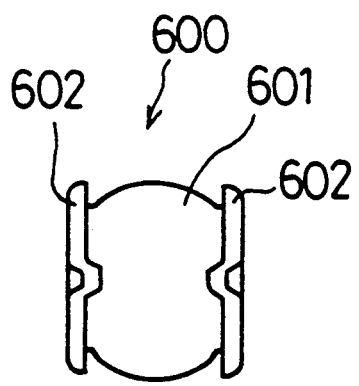
FIG. 6 is an enlarged front view of the operating damper shown in FIG. 5.

When the clutch disk of the preferred embodiment according to the present invention operates and a rotational moment is applied to the first dampers 20 thereof, the elastic members 22 of the first dampers 20 deform or swell in radial directions as illustrated in FIG. 3. Thus, the elastic members 22 of the first dampers 20 deform or swell less in radial directions than the conventional rubber-like elastic members 601 of the dampers 600 of the conventional clutch disk do as illustrated in FIG. 6. Accordingly, it is only necessary to enlarge the sheet members 23 of the first dampers 20 in radial directions by a minimum required dimension in order to inhibit the operating (i.e., deformed or swollen) elastic members 22 from interfering with the flange 11 of the clutch hub 10 and the first and second side plates 15. Hence, the elastic members 22 are made not to interfere with the flange 11 of the clutch hub 10 and the second and third side plates 15. In addition, since the elastic members 22 of the first dampers 20 deform or swell less in radial directions than the conventional rubber-like elastic members 601 do, especially at the central portion 22a thereof, the tensile stresses, caused by the rotational moment, can be relieved or dispersed to the central portion 22a of the elastic members 22, and accordingly the tensile stresses are concentrated less on the both ends 22b of the elastic members 22 than on the both ends of the conventional rubber-like elastic member 601. As a result, the elastic members 22 become less likely to break or come off the sheet members 23 at the both ends 22b thereof.

Having now fully described the present invention, it will be apparent to one of ordinary skill in the art that many changes and modifications can be made thereto without departing from the spirit or scope of the present invention as set forth herein including the appended claims.

What is claimed is:

1. A clutch disk comprising:
   a clutch hub including a flange formed on an outer periphery thereof, said flange having a plurality of openings and a plurality of cut-offs working as stoppers, and said clutch hub engaging with a rotary shaft;
   a first side plate including a plurality of openings disposed at positions corresponding to said openings of said flange of said clutch hub, and said first side plate disposed over one surface of said flange of said clutch hub;
   a second side plate including a plurality of openings disposed at positions corresponding to said openings of said flange of said clutch hub, said second side plate disposed over another surface of said flange of said clutch hub and connected to said first side plate by way of a plurality of stopper pins;
   a plurality of dampers for elastically connecting said clutch hub, said first side plate and said second side plate, said dampers disposed in said openings of said flange of said clutch hub, said openings of said first side plate and said openings of said second side plate, and including an elastic member tapering from wide to narrow in an axial direction thereof away from one end thereof to a central portion thereof and tapering from narrow to wide in an axial direction thereof away from said central portion thereof to another end thereof, and sheet members disposed on both ends of said elastic member; and
   a facing connected to an outer peripheral portion of one of said first side plate and said second side plate.,
   wherein said elastic member of said dampers has a cylindrical shape having a cross section defined by arc-like lines curving from wide to narrow in an axial direction thereof away from one end thereof to a central portion thereof and curving from narrow to wide in an axial direction thereof away from said central portion thereof to another end thereof, and
   wherein said sheet members of said dampers include a flat disk portion and a convexed portion disposed at a central portion thereof, and said elastic member of said dampers further has a concaved portion on both ends thereof, said concaved portion engaging with said convexed portion of said sheet members.

2. The clutch disk according to claim 1, wherein said elastic member of said dampers is made of at least one of a rubber, a flexible vinyl chloride resin and a flexible polyurethane foam.

3. A clutch disk comprising:
   a clutch hub including a flange formed on an outer periphery thereof, said flange having a plurality of openings and a plurality of cut-offs working as stoppers, and said clutch hub engaging with a rotary shaft;
   a first side plate including a plurality of openings disposed at positions corresponding to said openings of said flange of said clutch hub, and said first side plate disposed over one surface of said flange of said clutch hub;
   a second side plate including a plurality of openings disposed at positions corresponding to said openings of said flange of said clutch hub, said second side plate disposed over another surface of said flange of said clutch hub and connected to said first side plate by way of a plurality of stopper pins;
   a plurality of dampers for elastically connecting said clutch hub, said first side plate and said second side plate, said dampers disposed in said openings of said flange of said clutch hub, said openings of said first side plate and said openings of said second side plate, and including an elastic member tapering from wide to narrow in an axial direction thereof away from one end thereof to a central portion thereof and tapering from narrow to wide in an axial direction thereof away from said central portion thereof to another end thereof, and sheet members disposed on both ends of said elastic member; and
   a facing connected to an outer peripheral portion of one of said first side plate and said second side plate,
   wherein said elastic member of said dampers has a shape in which two truncated cones are connected at top surfaces thereof.

4. The clutch disk according to claim 3, wherein said elastic member of said damper sis made of at least one of a rubber, a flexible vinyl chloride resin and a flexible polyurethane foam.

* * * * *